United States Patent [19]

Holmes

[11] 4,335,402
[45] Jun. 15, 1982

[54] INFORMATION TRANSMISSION DURING FIRST-EQUALIZING PULSE INTERVAL IN TELEVISION

[75] Inventor: David D. Holmes, Trenton, N.J.

[73] Assignee: RCA Corporation, New York, N.Y.

[21] Appl. No.: 206,946

[22] Filed: Nov. 14, 1980

[30] Foreign Application Priority Data

Jul. 1, 1980 [GB] United Kingdom ................. 8021570

[51] Int. Cl.³ .............................................. H04N 7/08
[52] U.S. Cl. .................................................. 358/147
[58] Field of Search ................ 358/147, 146, 256, 258

[56] References Cited

U.S. PATENT DOCUMENTS 2,874,213 2/1959 Beers .................................... 358/147

Primary Examiner—Richard Murray
Attorney, Agent, or Firm—Paul J. Rasmussen; William H. Meise; Henry I. Steckler

[57] ABSTRACT

A teletext system transmits auxiliary information before the vertical sync pulse in the vertical blanking interval to avoid interference to the normal transmitted picture. At the transmitter a time gap is placed in the auxiliary information to allow for the equalizing pulses, while at the receiver the gap is removed. One, two, or all three lines that occur before the vertical sync pulse in the vertical blanking interval can be used to transmit the auxiliary teletext information signals.

10 Claims, 5 Drawing Figures

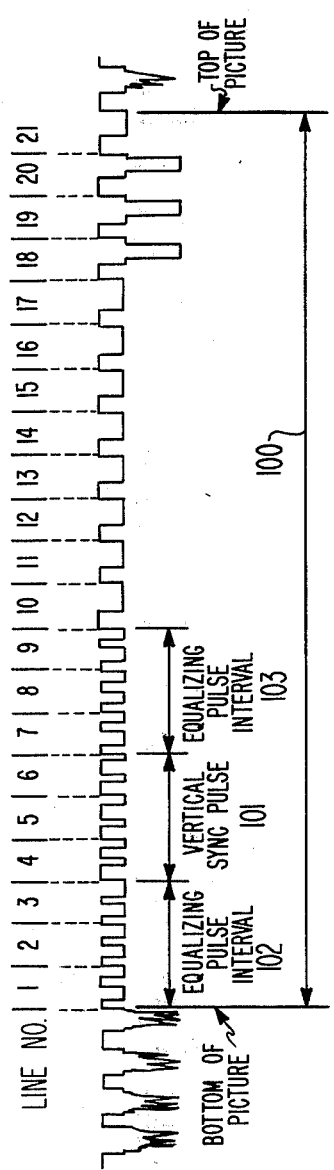
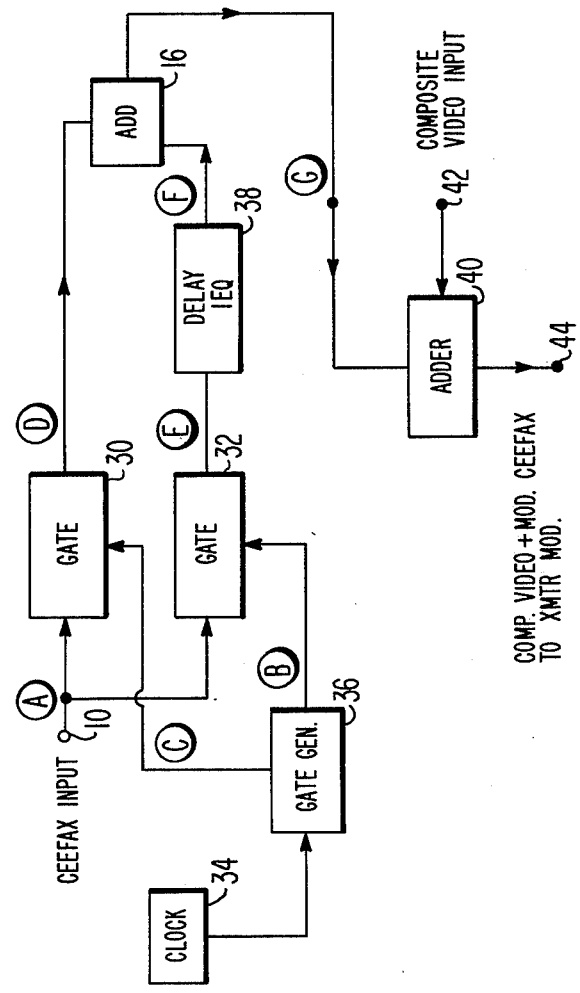
Fig. 1.
Fig. 2.

INFORMATION TRANSMISSION DURING FIRST-EQUALIZING PULSE INTERVAL IN TELEVISION

BACKGROUND OF THE INVENTION

The present invention relates to television systems, and more particularly, those that transmit information that is in addition to the normal video information ("teletext").

It is known that television video signals are reproduced using a cathode ray tube (CRT) that has an intensity modulated electron beam that sweeps from left to right and top to bottom across a fluorescent phosphor coated CRT face to produce a raster which contains a picture having an intensity at each point of the raster in accordance with the intensity of the beam at each respective point. When the beam reaches the bottom of the raster, it must thereafter jump back ("retrace") to the top. During such retrace, the electron beam must be cut-off ("blanked") to avoid generating spurious picture details. The time duration of this cut-off is known as the "vertical blanking interval" (VBI) and is designated by the numerical "100" in FIG. 1. During the VBI, there occurs a vertical synchronization signal 101, that determines exactly when the beam is to start its retrace. Preceding and succeeding the vertical sync signal 101 are three horizontal lines having equalizing pulses occuring at twice the horizontal frequency in first and second equalizing pulse intervals 102 and 103 respectively.

Teletext is a system for transmitting a still picture, such as a weather map, stock market report, general news, etc. that is time-division multiplexed onto a standard television signal. Each picture is called a "page", and the totality of all pages is called a "menu". Teletext and similar data transmission systems use coded signals inserted during horizontal lines 15, 16, 17 or 18 in the VBI. These teletext signals have picture level amplitudes, i.e., amplitudes between blanking and white levels. In some receivers, vertical retrace is relatively slow and vertical blanking is insufficient so that such a teletext signal may appear on the CRT display, thereby causing interference, i.e., the sweeping CRT electron beam is still coming back to the top of the CRT when the teletext signal starts being transmitted. In general, interference can occur from the insertion of teletext signals on any line after the vertical sync pulse if blanking is very insufficient.

It is desirable to use as many lines occurring in the VBI as practical to transmit teletext since the more lines, the higher the page transmission rate. However, it has been found impractical to use more than two lines after the vertical sync pulse in each VBI due to the interference problem discussed above.

Teletext or other data signals can be transmitted during the first equalizing pulse interval 102 shown in FIG. 1 when potential interference would be out of view below the bottom of the picture. Use of three lines per field with a 100 page continuous menu would result in a maximum waiting time for a selected page of about 10 seconds as compared to 30 seconds for a one-line system. The data format can be arranged to accomodate the twice horizontal line frequency equalizing pulses.

It is therefore desirable to have a teletext system that has a high transmission rate without causing interference to the normal displayed picture.

SUMMARY OF THE INVENTION

Method and apparatus comprises transmitting a television signal having a vertical synchronizing signal and equalizing signals occurring before and after said sychronization signal, and transmitting an additional information signal between said equalizing pulses that occur before said synchronization signal.

DESCRIPTION OF THE DRAWINGS

FIG. 1 is a diagram of the vertical blanking interval of a television signal;

FIG. 2 is a block diagram of a portion of a transmitter;

Figure 3:
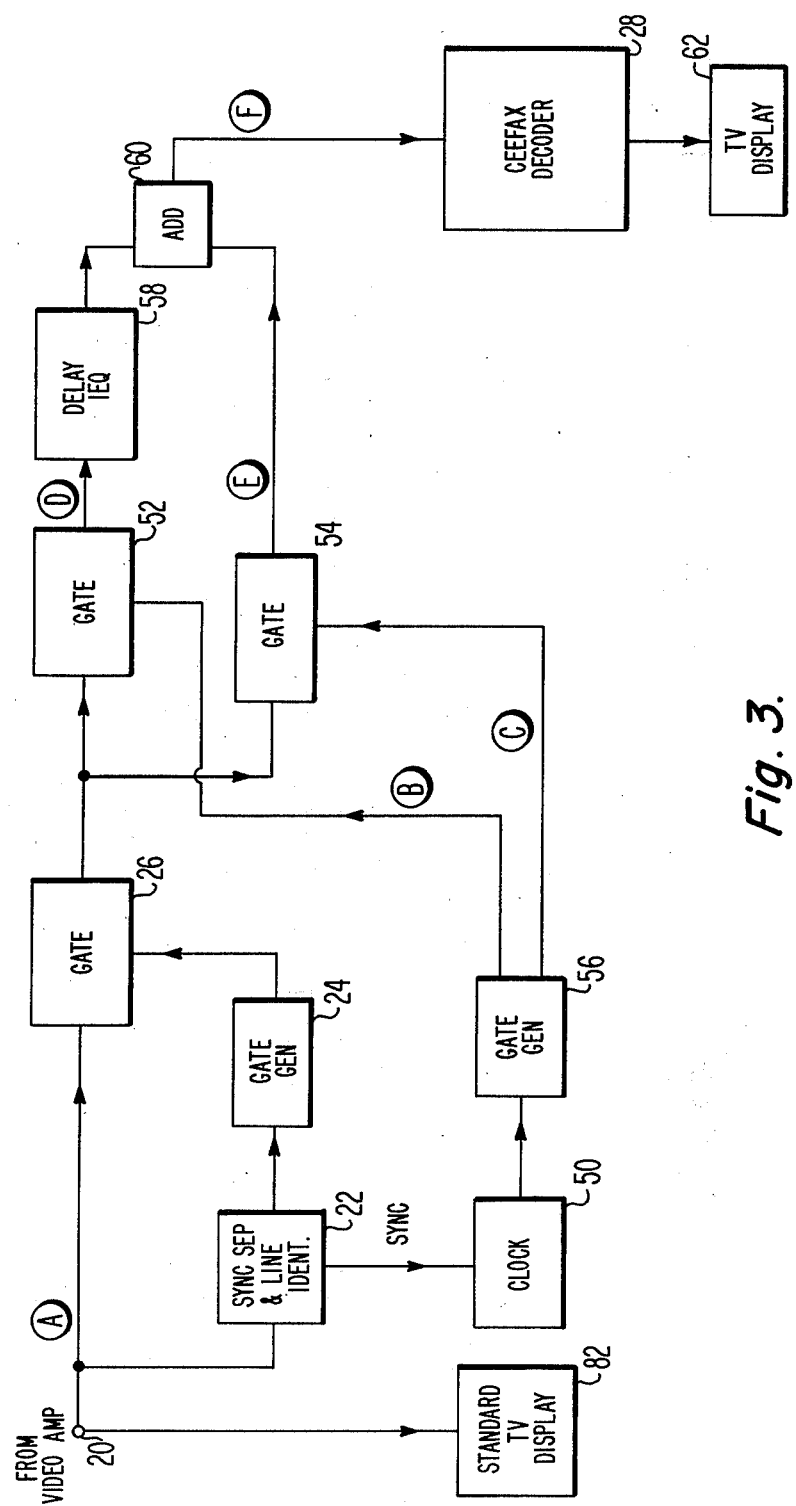
FIG. 3 is block diagram of a portion of a receiver.
Figure 4:
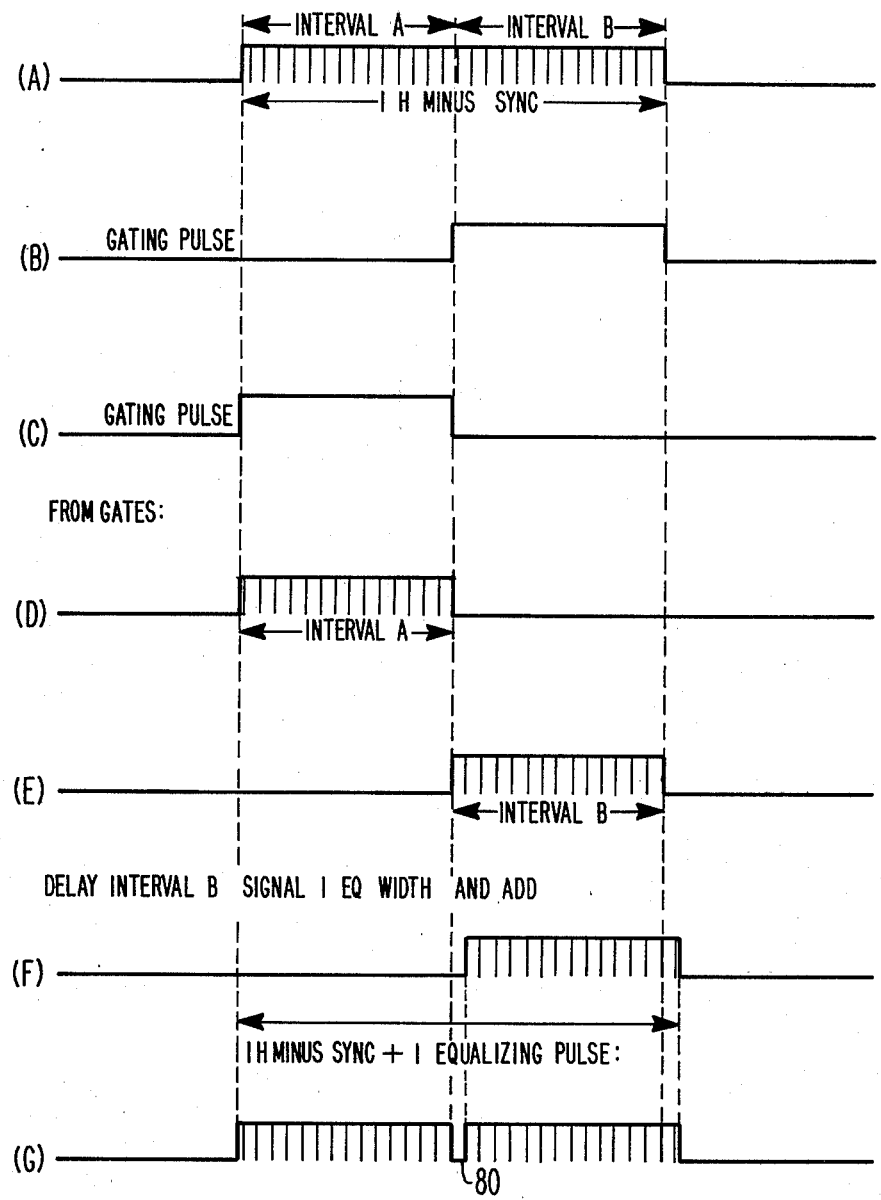
FIG. 4 is a timing diagram of waveforms that exist in FIG. 2.
Figure 5:
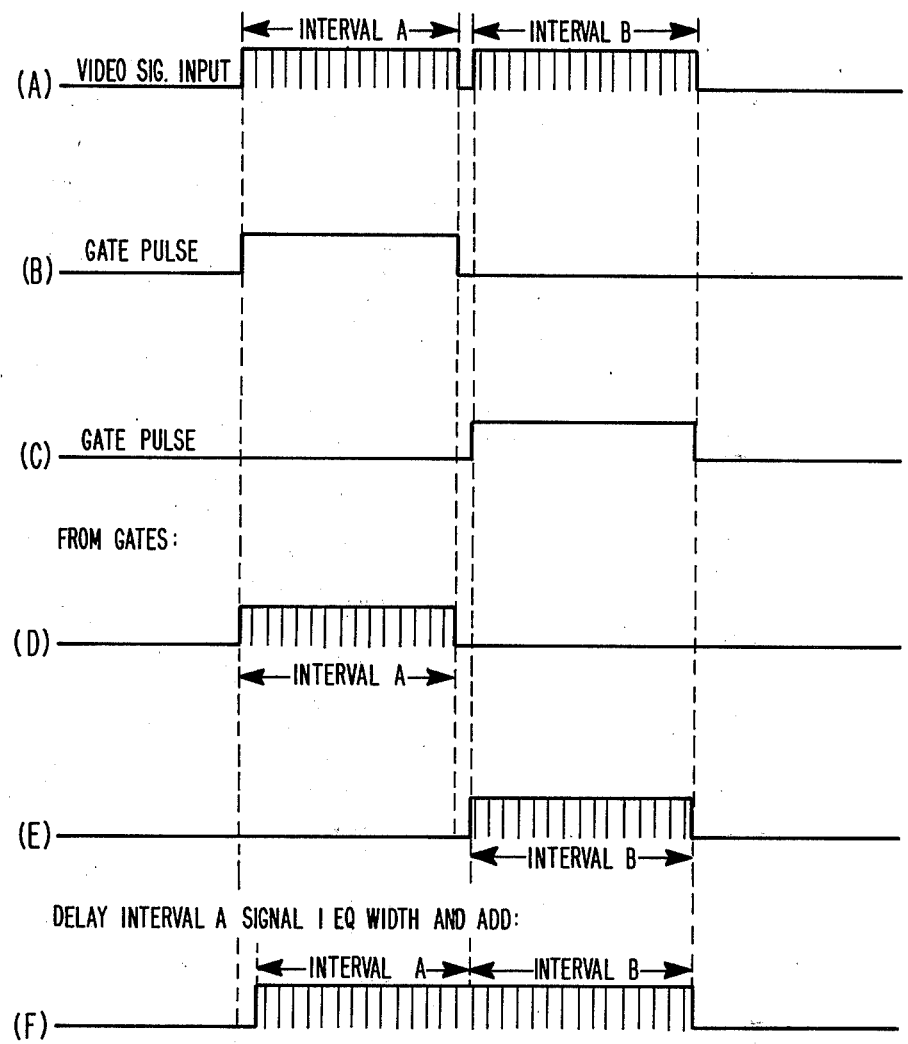
FIG. 5 is a timing diagram of wavforms that exist in FIG. 3.

It should be noted that FIGS. 2 and 3 have circled letters, which letters correspond to the lettered waveforms of FIGS. 4 and 5 respectively.

DETAILED DESCRIPTION

Teletext information is received during line 1 of FIG. 1 at input terminal 10 of the arrangement of FIG. 2 from, e.g. a Ceefax encoder (not shown) which is known in the art. As shown in FIG. 4A, Ceefax information has a signal duration during line 1 of one horizontal line minus one horizontal sync pulse width. (The information is in the form of about 300 bits of non-return to zero information taking place during this interval, which is shown as shading). The overall interval is divided in half into intervals A and B, since in the present invention the standard Ceefax signal must be interrupted to allow for the presence of equalizing pulses. The teletext information signal is applied to gates 30 and 32. A clock 34 applies clock signals to gating generator 36, which generator 36 provides to gates 30 and 32 gating pulses that start at the beginning of the equalizing pulse interval 102 and that correspond to intervals A and B respectively, as shown in FIGS. 4C and B, respectively. Thus, gate 30 provides a Ceefax output signal during interval A and no output during interval B, while gate 32 provides a Ceefax output signal during interval B but not during interval A, both as shown in FIGS. 4D and E, respectively.

The delay line 38 delays the signal of FIG. 4E by one equalizing pulse width to produce the signal of FIG. 4F. This signal of FIG. 4F is added to the signal of FIG. 4D by adder 16 to produce the signal of FIG. 4G, which is the same as a known prior art Ceefax signal except that it starts at the trailing edge of the first equalizing pulse in line 1 and has a gap 80 in the middle for the insertion of an equalizing pulse. It will be appreciated that only one line interval is shown in FIG. 4, the other two intervals being identical except for starting at the beginning of the remaining two lines 2 and 3 respectively in the first equalizing pulse interval 102.

Adder 40 receives the signal of FIG. 4G at one input and a standard composite video signal from terminal 42. As is conventional the composite video signal includes equalizing pulses, one of which pulses occurs during (and this fills in) the gap 80. Thus, at output terminal 44 there exists a standard composite video signal having a Ceefax teletext signal during the first three horizontal lines preceding the vertical sync signal. Adder 40 output terminal 44 is coupled to a transmitter modulator (not shown).

FIG. 3 shows a decoder for use in a receiver that receives transmissions from a transmitter having the encoder of FIG. 1. Terminal 20 receives a base-band video signal having a Ceefax teletext signal therein as shown in FIG. 5A. A standard TV display 82 displays the conventional video information contained in the video signal at terminal 20. A known sync separator and line identification counter 22 applies sync signals to clock 50 and a pulse identifying the trailing edge of the first equalizing pulse in line 1 to gate generator 24. Generator 24 generates and applies a three-line-wide pulse to gate 26. During the occurrence of this pulse, the teletext information is applied by gate 26 to gates 52 and 54.

Clock 50 provides pulses to gate generator 56, which generator 56 provides gating signals as shown in FIGS. 5B and C, respectively during intervals A and B respectively to gates 52 and 54. Gate 52 provides teletext signals during interval A, while gate 54 provides such signals during interval B as shown in FIGS. 5D and E, respectively. The signal of FIG. 5D is delayed by one equalizing pulse width by delay line 58 and added to the signal of FIG. 5E by adder 60 to form a standard continuous (without the equalizing pulse gap) Ceefax signal as shown in FIG. 5F. It will be appreciated that the operations depicted in FIG. 5 are repeated for the next two lines (lines 2 and 3 of FIG. 1). The standard Ceefax signal of FIG. 4F is applied to a known Ceefax decoder 28 from which it is read out as a standard TV signal and finally applied to display 62. Display 62 can therefore be the same as display 82.

The vertical retrace by which the scanning beam is returned to the top of the raster occurs after the beginning of the vertical sync pulse interval 101 because of the time delays involved in recognition of the vertical sync pulse. Consequently, the vertical retrace does not begin until after the Ceefax information is transmitted. The Ceefax information therefore exists in some of the last few horizontal lines at the bottom of the raster. These lines will ordinarily occur in an overscan portion of the raster, which is a portion of the raster near the edge of the picture tube which cannot be viewed because it is covered by a mask or frame surrounding the picture tube. Variations in beam intensity will cause the phosphor in the overscan region to emit light of various intensities, and these variations of light may be seen at the edge of the mask as a flicker which may be annoying. To eliminate the flicker, the Ceefax information may be encoded in such a manner that the average brightness remains constant. For example, the information may be encoded as phase or position modulation of pulses. Variations of the signal may vary the incremental position of a pulse but does not change the existence of the pulse or its amplitude. For high data rates, the average intensity is therefore constant and no flicker occurs.

It will be understood any one, two, or all three of the first three horizontal lines can be used to transmit teletext signals.

What is claimed is:

1. A method comprising transmitting a standard television signal, and transmitting an additional information signal during the first equalizing pulse interval of said standard television signal by dividing said additional signal into first and second time intervals separated in time by the duration of an equalizing pulse.

2. An apparatus comprising first means for transmitting a standard television signal, and second means for transmitting an additional information signal during the first equalizing pulse interval of said standard television signal, said second transmitting means comprising means for dividing said additional signal into first and second time intervals separated in time by the duration of an equalizing pulse.

3. An apparatus as claimed in claim 2, wherein said dividing means comprises a gate generator; first and second gates each having a first input coupled to said generator, a second input means for receiving said auxiliary signal, and an output; a delay line coupled to said first gate output; and a first adder having inputs coupled to said delay line and to said second gate output respectively, and an output; and wherein said first transmitting means comprises a second adder having a first input coupled to said first adder output and a second input means for receiving said television signal.

4. An apparatus as claimed in claim 2, wherein said additional signal comprises a Ceefax signal.

5. An apparatus as claimed in claim 2, wherein said auxiliary signal occurs during all horizontal lines of said first equalizing pulse interval.

6. A method for receiving a standard television signal and an additional information signal occuring during the first equalizing pulse interval of said standard television signal, said method comprising juxtaposing together portions of said auxiliary signal that occur in one line of said first equalizing pulse interval and separated by the duration of an equalizing pulse.

7. An apparatus for receiving a standard television signal, an additional information signal occurring during first equalizing pulse interval, said apparatus comprising means for juxtaposing together portions of said auxiliary signal that occur in one line of said first equalizing pulse interval and separated by the duration of an equalizing pulse.

8. An apparatus as claimed in claim 7, wherein said juxtaposing means comprises a first gate having an input means for receiving said standard television and auxiliary signals; a first gate generator coupled to said first gate to provide a gating signal occurring during said first equalizing pulse interval; second and third gates coupled to said first gate; a second gate generator coupled to said second and third gates for providing gating signals that occur between equalizing pulses; a delay line having a one equalizing pulse duration delay coupled to said second gate; and an adder having inputs respectively coupled to said delay line and said third gate, and an output means for providing a juxtaposed auxiliary signal.

9. An apparatus as claimed in claim 7, wherein said additional signal comprises a signal.

10. An apparatus as claimed in claim 7, wherein said auxiliary signal occurs between all equalizing pulses of said first equalizing pulse interval.

* * * * *